United States Patent [19]

Dawson

[11] 4,133,935
[45] Jan. 9, 1979

[54] COATED ELECTRODES FOR UNDERWATER METAL WORKING

[75] Inventor: Thomas J. Dawson, Falls Church, Va.

[73] Assignee: The United States of America as represented by the Secretary of the Navy, Washington, D.C.

[21] Appl. No.: 852,382

[22] Filed: Nov. 17, 1977

[51] Int. Cl.² .......................... D02G 3/00; B32B 27/32
[52] U.S. Cl. ....................................... 428/379; 156/85; 156/86; 219/70; 219/72; 427/58; 427/59; 428/461; 428/385
[58] Field of Search ...................... 219/70, 72; 156/85, 156/86; 428/375, 461; 427/58, 59, 285 R

[56] References Cited

U.S. PATENT DOCUMENTS

| | | | |
|---|---|---|---|
| 2,431,544 | 11/1947 | Dittrich | 219/70 |
| 2,433,018 | 12/1947 | Ronay | 219/70 |
| 3,037,529 | 6/1962 | Hancik | 156/85 |
| 3,787,655 | 1/1974 | Anderson et al. | 219/72 |
| 3,916,999 | 11/1975 | Ellis et al. | 156/86 |
| 4,035,534 | 7/1977 | Nyberg | 156/85 |

Primary Examiner—George F. Lesmes
Assistant Examiner—E. Rollins Buffalow
Attorney, Agent, or Firm—R. S. Sciascia; Philip Schneider; Thomas McDonnell

[57] ABSTRACT

A waterproof electrode useful in metal-working is obtained by coating the electrode with a polyolefin selected from the class consisting of polyethylene, polypropylene, polybutylene and mixtures thereof at a thickness from 0.25 cm to 0.80 cm by a method which comprises placing the electrode inside a polyolefinic heat-shrinkable tubing of a length sufficient to cover at least 0.6 cm of the bare metal of an electrode with a flux coating and sufficient to extend at least 0.8 cm beyond the electrode and with a diameter and a shrinkability sufficient to bring the polyolefin in contact with the bare metal of a flux-coated electrode.

8 Claims, 1 Drawing Figure

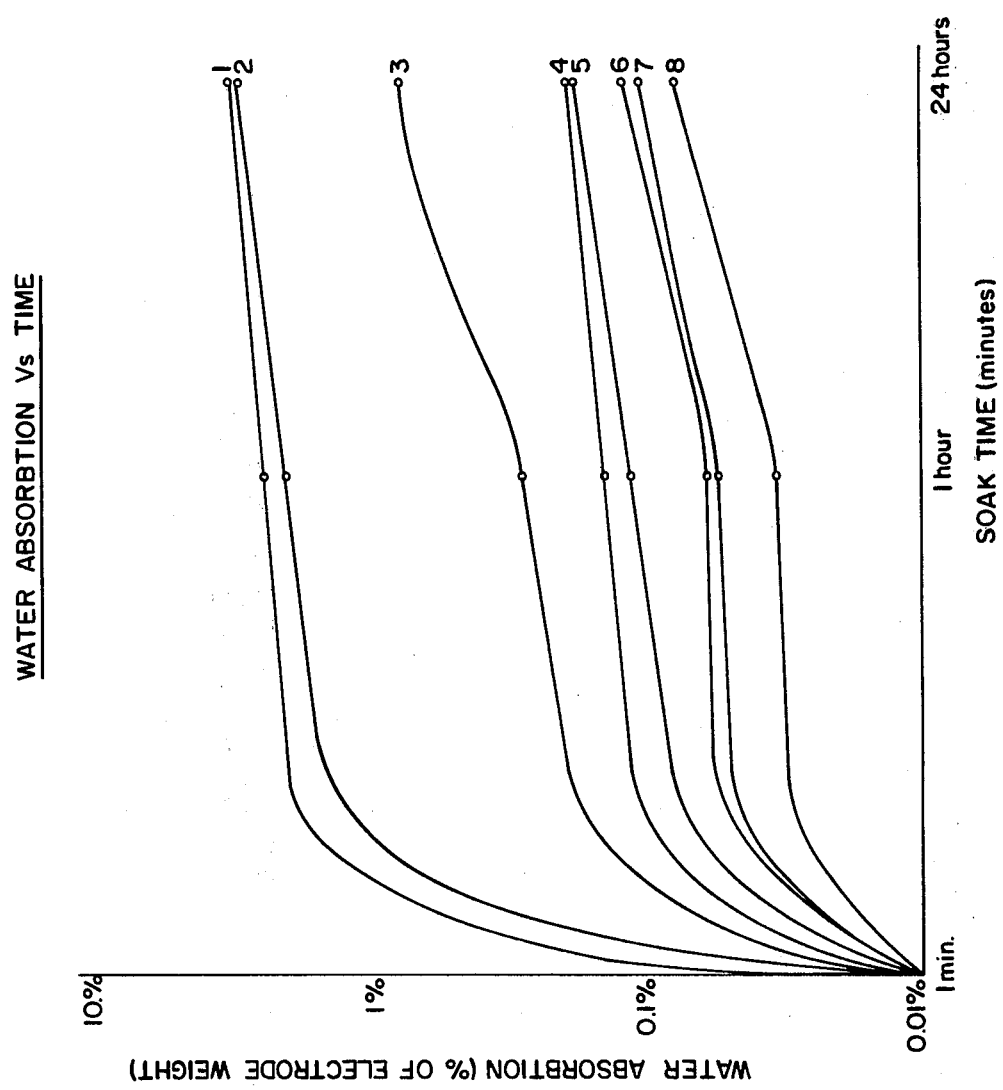

COATED ELECTRODES FOR UNDERWATER METAL WORKING

BACKGROUND OF THE INVENTION

The present invention pertains generally to metal working and particularly to electrodes for underwater, wet, electric-arc welding and oxyarc and arcair cutting.

The two principal operations in underwater metal working are welding and cutting. An electric-arc welder operates by establishing a confined arc between the work-piece and an electrode. Heat is generated by the arc and causes a molten pool in the surface of the work-piece and a melting of the electrode. As the electrode melts, metal is transferred from the electrode to the metal surface. The weld is formed when the molten metal solidifies upon cooling.

Generally, it is necessary to coat the electrode with flux in order to obtain a high-quality weld. Examples of chemical compounds used as fluxes are calcium silicate, iron silicate, ferrosilicon, titanium oxide, ferromanganese, and calcium fluoride. In a water environment, additional measures must be taken on account of the cooling effect of the water, hydrogen entrapment in the weld, electrical losses through the water, and destruction of the flux coating by water absorption.

Since oxyarc and arcair cutting processes are similar to electric-arc welding in that these processes utilize an electric arc between a work-piece and an electrode, these processes also experience serious problems in a water environment. The cooling effect of the water slows down the cutting and roughens the finish of the cut. The electrical losses through the water interfere with the control of the cutting.

Various techniques are employed to overcome these problems. One technique is to isolate the area to be worked from the water by a dry water-tight chamber which can be large enough to contain a man or just large enough for the metal-working tool. The main disadvantages with this technique are cost, slowness, and a limited application.

The technique showing the greatest potential is metal-working in a water environment with coated electrodes. These electrodes are prepared by coating the electrodes with a water-impervious material such as cellulose lacquer or polyvinyl chloride. The presently used materials and methods of applying the coating produce electrodes with numerous shortcomings. The electrodes are not sufficiently waterproofed on account of the porosity of material arising from its nature or the method of application and because of a poor seal between the coating and the electrode. Another defect is poor electrical insulation. Some of the coatings are applied too thickly or are made from materials which do not completely burn. Consequently, the coating interferes with the performance of the tool. Another defect inherent with some materials is that oxidation products thereof enter the welding puddle. Presently, electrodes cannot be easily waterproofed near the working area and so storage problems are encountered. Compounding this difficulty is the poor shelf-life of most waterproofed electrodes.

SUMMARY OF THE INVENTION

It is therefore an object of this invention to coat an electrode used in underwater metal-working with a material and in a manner which waterproofs and electrically insulates the electrode.

Another object of this invention is to coat such an electrode with a material which combusts completely and does not produce any objectionable combustion products.

A further object of the present invention is to coat such an electrode in a manner which is easy and fast and can be done by anyone near the work-site.

These and other objects are achieved by coating an electrode with a polyolefin selected from the class consisting of polyethylene, polypropylene, polybutylene, and mixtures thereof to a thickness from 0.25 cm to 0.80 cm by a method which prevents porosity in the coating so that the coating is able to waterproof electrodes under high pressure.

BRIEF DESCRIPTION OF THE DRAWINGS

The single FIGURE is a graph showing the amount of water absorption in relation to time for several coated and noncoated welding electrodes.

DETAILED DESCRIPTION OF THE INVENTION

A large number of electrodes can be easily waterproofed by the practice of the present invention. The electrodes may be made from carbon steel, stainless steel, nickel, nickel alloys, copper, copper alloys, aluminum, aluminum alloys, and other similar materials. The electrode may be a composite of two or more metals. Welding electrodes would, of course, have a flux coating, e.g., a mixture of two or more of the following materials; borax, boric acid, fluorides, chlorides, or silicates. The construction of the electrode is not material.

The coating material cannot have a water-absorption power greater than 0.10 weight percent/48 hours. The coating material must burn readily and completely and produce combustion products which do not interfere with the formation of a weld or enter the weld puddle. Examples of such non-interfering combustion products are methane, ethane, propane, and oxy-derivatives thereof. The coating material must have a dielectric strength of at least 300 volts/mil to ensure a minimum of electrical loss. Of the olefinic coating materials of this invention, a coating from 0.25 cm to 0.80 cm is needed to ensure sufficient waterproofing and electrical insulation and to ensure a clean fast burn of the coating material.

Any method may be used to apply the coating but the preferred method is by the strikingly novel method of utilizing heat-shrinkable tubing. The tubing is at least 20% shrinkable and preferably from 25 to 35 percent shrinkable for welding electrodes. These electrodes need an appreciable shrinkage on account of the flux coating. The flux coating generally has a thickness of 0.3 to 0.6 cm and does not extend the entire length of the electrode. Consequently, a shrinkage of at least 20 percent is generally needed to ensure a tight seal below the flux coating. With cutting electrodes, the shrinkage may be as low as 10 percent.

The tubing should be of sufficient length to provide an excess of at least 0.8 cm beyond the tip of the electrode so as to allow that end to be sealed by crimping the excess. If the electrode has a flux coating, the tubing should also be long enough in the other direction to provide a coating which extends at least 0.6 cm on the metal beyond the flux. The thickness of the tubing is sufficient to provide a coating from 0.25 to 0.80 cm in thickness. The diameter of the tubing is such that the electrode can easily slide inside the tubing. Generally, a difference from 0.003 to 0.010 cm is sufficient. If the tubing has sufficient shrinkage, the diameter of the tubing may be any size.

An electrode is coated by inserting the electrode inside the tubing and by heating the combination until the tubing has shrunk sufficiently for a watertight coating. The temperature used should not exceed 90% of the melting point in degrees Celcius of the material selected. As a general guide, polyolefinic materials are heated at a temperature from 95° C. to 150° C. As can be seen, this method provides a convenient method by which electrodes can be easily and quickly coated at the job site by anyone.

In order to demonstrate the advance produced by the present invention, the following examples are given. It is understood that these examples are given by way of illustration and are not intended to limit the present specification or the claims to follow in any manner.

EXAMPLES 1-8

Eight welding electrodes whose characteristics are summarized in TABLE I were placed in 6 inches of seawater. The amount of water absorption was measured over a 24 hour period. The results are given in the FIGURE.

TABLE I

| Example No. | Type |
| --- | --- |
| 1 | Uncoated electrode was baked for 1 hour at 200° C to remove moisture from the flux coating. |
| 2 | Uncoated |
| 3 | Commerical coated electrode (copolymer of pvc and acetate) |
| 4 | coated with polyvinyldene fluoride shrink tubing |
| 5 | coated with neoprene shrink tubing |
| 6 | coated with a slightly fluorinated vinyl shrink tubing. |
| 7 | coated with a polyethylene shrink tubing |
| 8 | coated with a halogenated polyethylene shrink tubing |

EXAMPLES 9-15

Electrodes of the same types as Examples 3-8 were used underwater. The welds produced by the electrodes of the type in Example 7 did not show any contamination by the waterproofing coating. Further, this coating burned completely and thus did not produce any interfering stringers, i.e., strings or strands of the coating which remain after combustion. The electrodes of the type in Examples 4, 6 and 8 produced excellent welds but also produced objectionably long stringers. The electrode of Example 5 had a small stringer, but was objectionable on account of the formation of a hard cup at the end of the electrode if welding stopped. This hard cup prevented the electrode from being restarted under water. The electrode of the type of Example 3 produced a poorer weld than the previous electrodes due to the inclusion of hydrogen and porosity in the weld puddle.

On the basis of the experiments, electrodes coated by the shrink-tubing method with a polyolefin selected from the class consisting of polyethylene, polypropylyene, and polybutylene provide a significant improvement in the quality of underwater welding. These materials provided the best water protection and interfered the least with the formation of the weld.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A waterproofed electrode suitable for wet metal-working which comprises an electrode and a coating comprising from 0.25 to 0.80 cm of a thermally degradable material having a dielectric strength of at least 300 volt/mil, and a water absorption power of not greater than 0.10 weight percent/48 hours; said coating is produced by the method comprising encasing said electrode in a heat-shrinkable tubing of a polyolefin selected from the class consisting of polyethylene, polypropylene, polybutylene, and mixtures thereof and heating said electrode at a temperature not exceeding 90% of the melting point in degrees centigrade of said tubing until said tubing has tightly sealed said electrode.

2. The electrode of claim 1 wherein said polyolefin is polyethylene.

3. The electrode of claim 1 wherein said polyolefin is polypropylene.

4. The electrode of claim 1 wherein said coating covers at least 0.6 cm of the bare metal if the electrode is partially flux coated and completely covers the welding end of said electrode.

5. A method of coating an electrode suitable for wet metal-working which comprises placing said electrode in a heat shrinkable tubing of a material selected from the class consisting of polyethylene, polypropylene, polybutylene, and mixtures thereof, said tubing having a length sufficient to seal said electrode and to extend at 0.8 cm beyond the end of said electrode which contacts a work-piece and a thickness from 0.25 to 0.8 cm; shrinking said tubing until said electrode is sealed; and crimping said tubing thereby sealing the end of said electrode which contacts a work-piece.

6. The method of claim 5, wherein said heat-shrinkable tubing has a diameter from 0.003 cm to 0.010 cm greater than the diameter of said electrode and is capable of shrinking at least 10%.

7. The method of claim 6 wherein said tubing is capable of shrinking at least 20%.

8. The method of claim 6, wherein said tubing is capable of shrinking from 25 to 35%.

* * * * *